US008688360B2

(12) United States Patent
Norden et al.

(10) Patent No.: US 8,688,360 B2
(45) Date of Patent: Apr. 1, 2014

(54) METHOD FOR OPERATING A FORDING-CAPABLE MOTOR VEHICLE, AND FORDING-CAPABLE MOTOR VEHICLE

(75) Inventors: Roland Norden, Markgroeningen (DE); Michael Bildstein, Stuttgart (DE); Herbert Prickarz, Fellbach (DE); Kaspar Schmoll Genannt Eisenwerth, Vaihingen-Horrheim (DE)

(73) Assignee: Robert Bosch GmbH, Stuttgart (DE)

( * ) Notice: Subject to any disclaimer, the term of this patent is extended or adjusted under 35 U.S.C. 154(b) by 343 days.

(21) Appl. No.: 13/057,520

(22) PCT Filed: Jul. 27, 2009

(86) PCT No.: PCT/EP2009/059639
§ 371 (c)(1),
(2), (4) Date: Apr. 27, 2011

(87) PCT Pub. No.: WO2010/015537
PCT Pub. Date: Feb. 11, 2010

(65) Prior Publication Data
US 2011/0202265 A1 Aug. 18, 2011

(30) Foreign Application Priority Data

Aug. 7, 2008 (DE) .......................... 10 2008 041 105

(51) Int. Cl.
*G06F 17/00* (2006.01)
(52) U.S. Cl.
USPC ................. 701/113; 60/297; 60/274; 60/285; 60/295; 60/311; 180/65.1; 180/65.6; 180/65.7
(58) Field of Classification Search
USPC ............ 123/179.3, 179.4, 685, 690; 701/113, 701/114
See application file for complete search history.

(56) References Cited

U.S. PATENT DOCUMENTS

| 4,787,869 | A | 11/1988 | Shiozawa |
| 5,355,673 | A | 10/1994 | Sterling et al. |
| 6,213,829 | B1 * | 4/2001 | Takahashi et al. ............ 440/113 |
| 6,746,290 | B2 * | 6/2004 | Nakata et al. ................ 440/89 R |
| 6,865,472 | B2 * | 3/2005 | Nakamura ..................... 701/108 |
| 6,910,329 | B2 * | 6/2005 | Bunting et al. ................. 60/297 |
| 6,913,558 | B2 * | 7/2005 | Mori et al. ........................ 477/3 |
| 7,401,606 | B2 * | 7/2008 | Lewis et al. ................... 123/685 |
| 7,484,816 | B2 * | 2/2009 | Maruyama et al. ........... 303/191 |
| 7,558,668 | B2 * | 7/2009 | Ammineni et al. ........... 701/114 |
| 7,623,953 | B2 * | 11/2009 | Withrow et al. .............. 701/101 |
| 7,869,932 | B2 * | 1/2011 | Boesch ......................... 701/112 |

(Continued)

FOREIGN PATENT DOCUMENTS

CN 1425849 6/2003

*Primary Examiner* — Stephen K Cronin
*Assistant Examiner* — Gonzalo Laguarda
(74) *Attorney, Agent, or Firm* — Kenyon & Kenyon LLP

(57) ABSTRACT

A motor vehicle having an internal combustion engine, a differential pressure sensor or two pressure sensors for detecting a pressure difference, which may be in an exhaust tract of the internal combustion engine, and an evaluation unit for evaluating the detected pressure difference. Moreover, the present invention relates to a method for operating a motor vehicle. A controlling arrangement is provided for controlling an automatic start-stop system or an ignition system of the motor vehicle as a function of the result of the evaluation of the detected pressure difference used to detect immersion or submersion of a tailpipe of the exhaust tract in water, sludge, or a similar liquid medium in order to prevent the internal combustion engine from shutting off when the tailpipe is immersed or submerged.

9 Claims, 2 Drawing Sheets

(56) References Cited

U.S. PATENT DOCUMENTS

| | | | |
|---|---|---|---|
| 2007/0000241 A1* | 1/2007 | Funke et al. | 60/295 |
| 2007/0022746 A1* | 2/2007 | Decou et al. | 60/295 |
| 2008/0018442 A1* | 1/2008 | Knitt | 340/438 |
| 2008/0155964 A1 | 7/2008 | Kilkenny | |

\* cited by examiner

METHOD FOR OPERATING A FORDING-CAPABLE MOTOR VEHICLE, AND FORDING-CAPABLE MOTOR VEHICLE

FIELD OF THE INVENTION

The present invention relates to a method for operating a motor vehicle, and a motor vehicle.

BACKGROUND INFORMATION

In particular motor vehicles having a diesel engine and an exhaust gas aftertreatment unit which includes a particle filter situated in the exhaust tract of the diesel engine are frequently equipped with a differential pressure sensor which may be used to detect the difference between exhaust gas pressures upstream and downstream from the particle filter in order to deduce the instantaneous loading of the particle filter with soot particles or the optimal time for regenerating the particle filter, by evaluating the detected pressure difference.

All-terrain vehicles in particular must generally have a certain minimum fording capability in order to travel through shallow water, whereby their tailpipe outlet may go under the water surface. To prevent water which penetrates into the tailpipe from flooding parts of the exhaust tract and thus causing damage to the particle filter or other components of the exhaust gas aftertreatment unit, fording-capable motor vehicles are generally designed in such a way that during operation the internal combustion engine cannot stall when traveling through shallow water, and the exhaust gas pressure generated during operation of the internal combustion engine prevents water from reaching the rear muffler.

As the result of continuing efforts in the motor vehicle industry to reduce exhaust gas emissions from and fuel consumption in motor vehicles, it is becoming increasingly common to equip motor vehicles with a hybrid drive, and with a so-called automatic start-stop system which shuts off the internal combustion engine as a function of detected operating parameters such as battery charge state, engine temperature, catalytic converter temperature, accelerator or brake pedal position, and gear selection, for example, in different operating states and restarts the engine, for example when the vehicle is at a standstill.

When the all-terrain or fording-capable motor vehicles are micro, mild, or full hybrid vehicles having an automatic start-stop system, situations may arise in the operation of these vehicles in which the automatic start-stop system shuts off the internal combustion engine when the vehicle is traveling through shallow water, for example when the vehicle is stopped when crossing a body of water. If the outlet of the tailpipe is completely or partially below the water surface at that time, this may result in parts of the exhaust tract being flooded with water due to the lack of exhaust gas pressure.

SUMMARY OF THE INVENTION

On this basis, an object of the exemplary embodiments and/or exemplary methods of the present invention is to reliably prevent damage to components of the exhaust gas aftertreatment unit due to penetration of water, sludge, or similar liquid media into the exhaust tract of the motor vehicle.

This object may be achieved according to the exemplary embodiments and/or exemplary methods of the present invention in that a pressure difference, which may be a pressure difference detected in an exhaust tract of the internal combustion engine, is evaluated in order to detect immersion or submersion of a tailpipe of the exhaust tract in water, sludge, or similar liquid media.

The method according to the present invention may be intended for motor vehicles having a hybrid drive and an automatic start-stop system, in which the automatic start-stop system is controlled as a function of a result of the evaluation in such a way that the automatic start-stop system is prevented from shutting off the internal combustion engine, and/or a shut-off internal combustion engine is started with the aid of the automatic start-stop system when the evaluation of the pressure difference indicates immersion or submersion of the tailpipe of the exhaust tract in water or sludge when the motor vehicle is traveling through shallow water.

However, in principle the method according to the present invention may also be used in conventional fording-capable motor vehicles which are only equipped with an internal combustion engine, in that shutting off the internal combustion by the driver of the motor vehicle is prevented by suitable control of the ignition system as a function of the result of the evaluation after immersion or submersion of the tailpipe of the exhaust tract in water or sludge when the vehicle is traveling through shallow water.

One embodiment of the present invention which is particularly suited for motor vehicles having a diesel engine provides for evaluating the pressure difference between an exhaust gas pressure detected upstream and downstream from a particle filter in the exhaust tract of the internal combustion engine in order to detect the immersion or submersion of the tailpipe of the exhaust tract in water or sludge, since for many motor vehicles having a diesel engine this pressure difference is already routinely detected and evaluated with the aid of a differential pressure sensor in order to ascertain the loading state of the particle filter as the basis for regenerating the particle filter. In this case, use may be made of the existing differential pressure sensor as well as an existing evaluation unit which is used for evaluating the measuring results of the differential pressure sensor, it being necessary to adapt or reprogram only the evaluation unit for the additional function.

The evaluation unit may evaluate a time-dependent change in the pressure difference, and when there is a sharp decrease in the pressure difference it is advantageously deduced that a sharp increase in the exhaust gas pressure downstream from the particle filter has occurred due to penetration of water or sludge into the tailpipe of the exhaust tract. Alternatively or additionally, however, a discontinuous variation in the pressure difference over time during a decrease in the pressure difference caused by a surge-like release of exhaust gas from the tailpipe, and/or a wave-like variation in the pressure difference over time after a decrease which is caused by the discharge of individual exhaust gas bubbles from the tailpipe, may be evaluated as an indication for immersion or submersion of the tailpipe in water or sludge.

However, it is also possible to compare the detected pressure difference to at least one stored pressure difference which is recorded for an immersed or submerged tailpipe, or to compare the variation in the pressure difference over time to at least one stored pressure difference curve which is recorded for an immersed or submerged tailpipe, and to deduce that the tailpipe is immersed or submerged in water or sludge when the comparison results in significant agreement.

When during operation of the internal combustion engine it is deduced in the evaluation of the pressure difference that the tailpipe is immersed or submerged in water or sludge a blocking signal may be transmitted to the automatic start-stop system or to the ignition system of the motor vehicle, these systems may be configured or programmed in such a way that shutting off the internal combustion engine by the automatic start-stop system or by the driver turning an ignition key is prevented while the blocking signal is being received, or until an enabling signal which cancels the blocking signal is received.

To prevent the driver from allowing his motor vehicle to roll into the water when the internal combustion engine is shut off, which may result in flooding of the exhaust tract or a portion thereof due to the lack of exhaust gas pressure, according to another advantageous embodiment of the present invention it is proposed, at least for motor vehicles having an automatic start-stop system, that the automatic start-stop system automatically starts the shut-off internal combustion engine when the evaluation of the pressure difference with the internal combustion engine shut off indicates that the tailpipe of the exhaust tract is immersed or submerged in water or sludge. This is the case, for example, when the differential pressure sensor detects a negative pressure difference due to the fact that the pressure in the exhaust tract is higher downstream than upstream from the particle filter due to the inflowing water or sludge. After the internal combustion engine is started, it may also be provided to increase the idling speed and/or adjust the start of injection or the ignition angle of the internal combustion engine in order to increase the exhaust gas volumetric flow, and thus to reliably prevent penetration of liquid media into the exhaust tract, even at fairly great fording depths.

With regard to the internal combustion engine, the object is achieved according to the exemplary embodiments and/or exemplary methods of the present invention in that the motor vehicle includes a controlling arrangement for controlling its automatic start-stop system or its ignition system as a function of the result of the evaluation of the evaluation unit. The evaluation unit may transmit a blocking signal to the automatic start-stop system or to the ignition system which during operation of the internal combustion engine prevents the engine from shutting off when the pressure difference detected by the differential pressure sensor and evaluated by the evaluation unit indicates immersion or submersion of a tailpipe of the exhaust tract in water or sludge.

In principle, instead of a differential pressure sensor an ambient pressure sensor and an exhaust gas pressure sensor may be used to detect immersion or submersion of the tailpipe of the exhaust tract in water or sludge. In this case, the evaluation unit evaluates the pressure difference between the absolute pressure detected by the ambient pressure sensor and the absolute pressure detected by the exhaust gas pressure sensor, which increases when the tailpipe of the exhaust tract is immersed or submerged in water or sludge.

The exemplary embodiments and/or exemplary methods of the present invention are explained in greater detail below with reference to one exemplary embodiment illustrated in the drawings.

DETAILED DESCRIPTION

Figure 1:
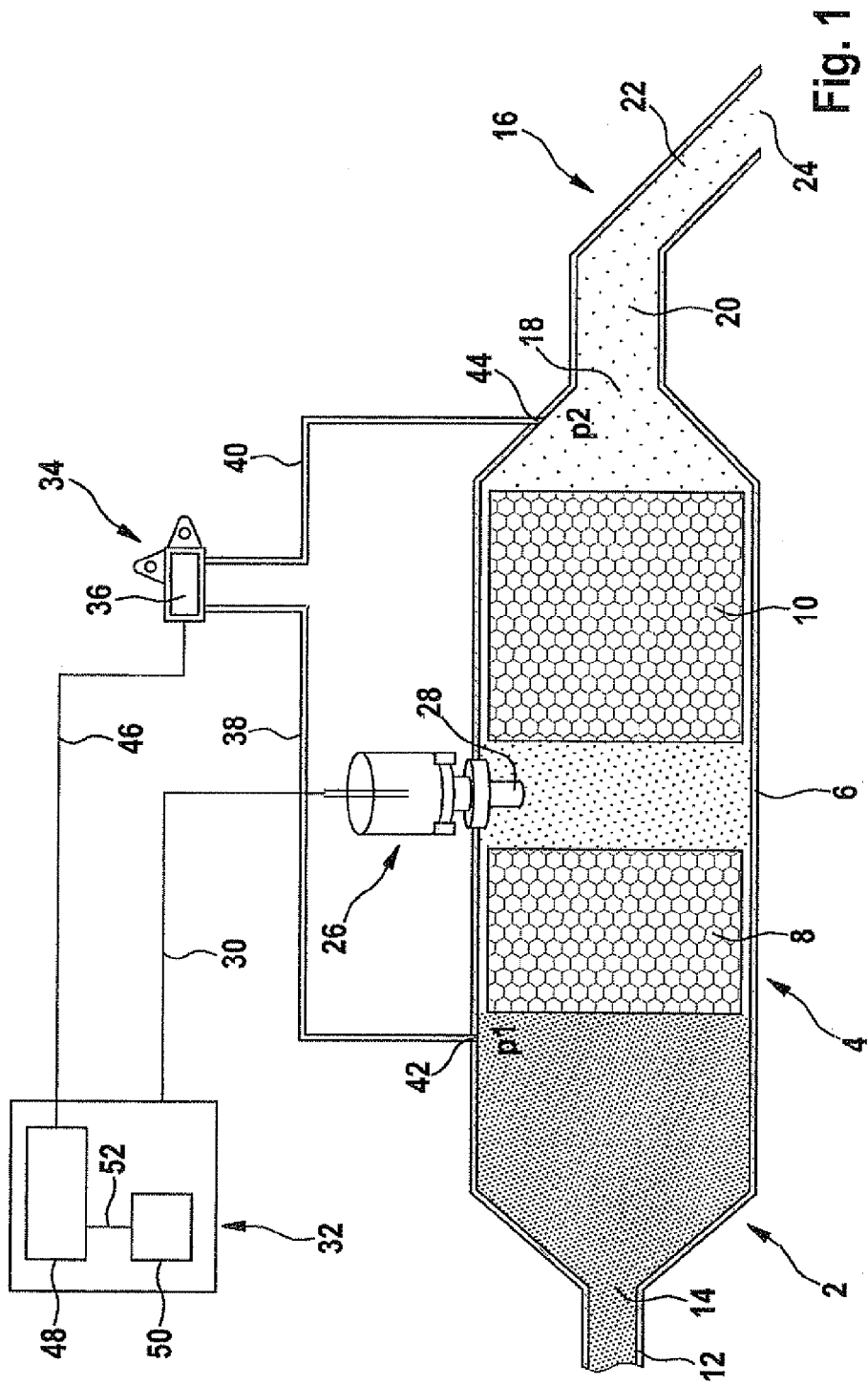
FIG. 1 shows a schematic illustration of portions of an exhaust tract of a diesel-driven motor vehicle, having a particle filter and a differential pressure sensor.

Exhaust system 2 of a diesel-driven all-terrain, fording-capable motor vehicle, which is only partially illustrated in FIG. 1, includes a particle filter 4 which is part of an exhaust gas aftertreatment unit of the motor vehicle. Particle filter 4 is essentially composed of a cylindrical filter housing 6 and two filter cartridges 8, 10 which are inserted into filter housing 6 at a distance from one another and through which exhaust gas of a diesel engine (not illustrated) of the motor vehicle flows. Filter housing 6 has an inlet 14 which is connected to the diesel engine via an exhaust pipe 12, and an outlet 18 which is connected to an exhaust system 16 of exhaust tract 2; inlet 14 and outlet 18 are situated at oppositely tapered end faces of filter housing 6. Exhaust system 16 includes in a known manner a rear muffler 20 and a tailpipe 22 having a downwardly sloping outlet 24 for the exhaust gas.

Exhaust tract 2 is also equipped with a temperature sensor 26, which is mounted on the exterior of filter housing 6 and which has a temperature probe 28 which protrudes into filter housing 6 between filter cartridges 8, 10. Temperature sensor 26 is connected via a signal line 30 to an engine control unit 32 which is used to control the diesel engine. Temperature sensor 26 detects the exhaust gas temperature inside filter housing 6 during operation of the diesel engine and transmits same to engine control unit 32.

Exhaust tract 2 is also equipped with a differential pressure sensor 34. Differential pressure sensor 34 encloses in a known manner a cavity 36 which is subdivided into two chambers which are separated from one another in a gas-tight manner by a diaphragm (not illustrated). One of the two chambers is connected to a first pressure measuring line 38 which opens into filter housing 6 upstream from first filter cartridge 8, while the other chamber is connected to a second pressure measuring line 40 which opens into filter housing 6 downstream from second filter cartridge 10.

Differential pressure sensor 34 measures the pressure difference between the two chambers via the deflection of the diaphragm between the two chambers, which corresponds to the difference in the exhaust gas pressures between two measuring points 42 and 44 at the entry points of the two pressure measuring lines 38 and 40, respectively, into filter housing 6.

Differential pressure sensor 34 is connected via a signal line 46 to an evaluation unit 48, which in the present case is part of engine control unit 32 of the diesel engine, but which may also be designed as a separate unit. Besides evaluation unit 34, engine control unit 32 includes an automatic start-stop system 50 which automatically shuts off and restarts the diesel engine as a function of a particular operating strategy when certain operating states specified by the operating strategy are present. Automatic start-stop system 50 is connected to evaluation unit 48 via a signal line 52.

Figure 2:
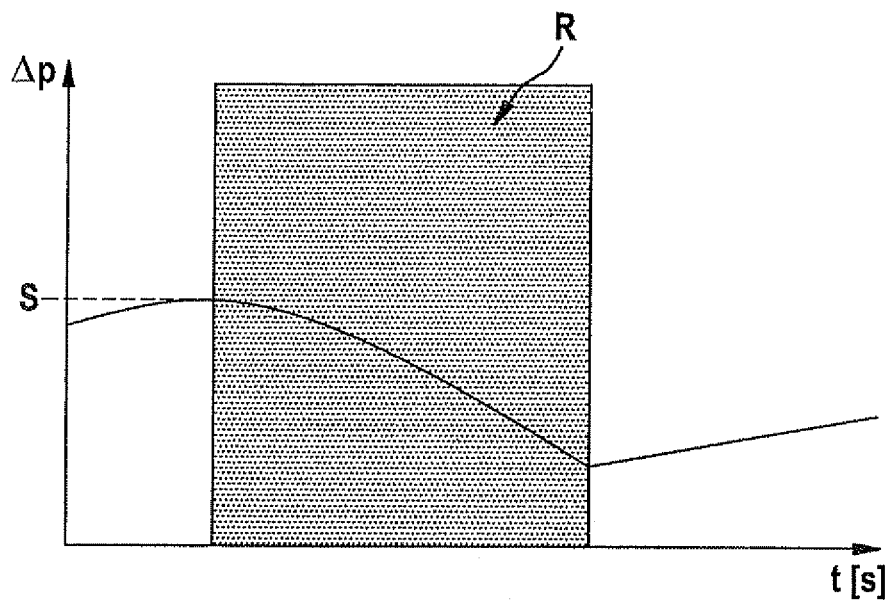
FIG. 2 shows the curve of a pressure difference, measured by the differential pressure sensor, between two measuring points respectively upstream and downstream from the particle filter before, during, and after a regeneration of the particle filter.

During operation of the diesel engine, evaluation unit 48 is used in a manner known per se to initiate the regeneration of filter cartridges 8, 10 of particle filter 4 by evaluating measured pressure difference $\Delta p$ between the two measuring points 42, 44 when the loading of, the particle filter with soot particles, and thus pressure difference $\Delta p = p1 - p2$ of exhaust gas pressures p1 upstream from, and p2 downstream from, filter cartridges 8, 10 exceeds a predefined threshold value S, as illustrated in FIG. 2. During the regeneration of particle filter 4 the soot particles are combusted on filter cartridges 8, 10, causing pressure difference Δp between the two measuring points 42, 44 to decrease, as illustrated in range R=regeneration in FIG. 2. After the regeneration has concluded, pressure difference Δp once again gradually increases, while soot particles collect once again on filter cartridges 8, 10.

However, evaluation unit 48 is also used to detect immersion or submersion of tailpipe 22 of exhaust system 16 in water when the motor vehicle is traveling through shallow or deeper water by evaluating detected pressure difference Δp between the two measuring points 42, 44, or by evaluating the curve of pressure difference Δp.

When the diesel engine is running, as the result of immersion of tailpipe 22 in water, the exhaust gas is no longer able to escape unhindered through outlet 24 of tailpipe 22 when the outlet is completely or partially below the water level. During the time that outlet 24 of tailpipe 22 is immersed in the water, the free cross-sectional opening of tailpipe 22 decreases relatively quickly, thus increasing the flow resistance of the exhaust gas in tailpipe 22, and thus also increasing exhaust gas pressure p2 at measuring point 44 downstream from filter cartridges 8, 10. This in turn results in a decrease in pressure difference Δp detected by differential pressure sensor 34, as illustrated in FIG. 3 between the two points in time A and B, A representing the point in time at the start of the immersion of outlet 24 of tailpipe 22 in the water, and B representing the point in time when outlet 24 is completely immersed in the water.

Figure 3:
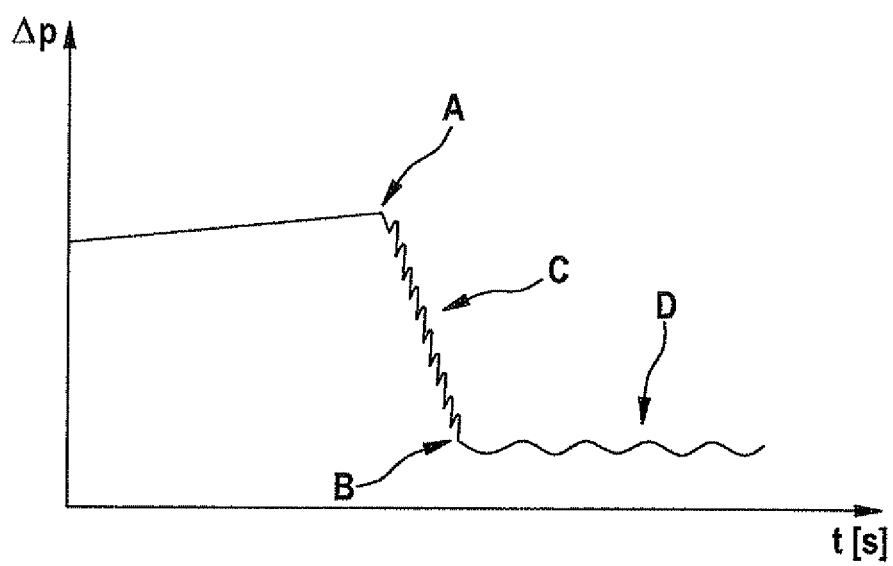
FIG. 3 shows the curve of a pressure difference, measured by the differential pressure sensor, between the two measuring points when a tailpipe of the exhaust tract is immersed or submerged in water.

As is apparent from a comparison of the curve of pressure difference Δp during a regeneration of particle filter 4 on the one hand, as illustrated in FIG. 2, and the curve of pressure difference Δp during travel of the motor vehicle through shallow or deeper water on the other hand, as illustrated in FIG. 3, first of all during the decrease in pressure difference Δp in the latter case the gradient of the pressure difference curve is significantly steeper in the range between the two points in time A and B than in the former case for the gradient in range R, so that a clear distinction may be made between a filter regeneration and travel through shallow or deeper water by evaluating the gradient.

Another feature which is suitable for distinguishing between filter regeneration and travel through shallow or deeper water is the discontinuous or stepped decrease in pressure difference Δp between the two points in time A and B, illustrated in FIG. 3. Such a curve of pressure difference Δp is caused by the exhaust gas exiting from outlet 24 of tailpipe 22 in a surge-like manner during the immersion of the tailpipe 22 in water, so that exhaust gas pressure p2 downstream from particle filter 4 increases discontinuously, not continuously, during this process, resulting in a corresponding discontinuous decrease in pressure difference Δp, as illustrated by C in FIG. 3.

The curve of differential pressure Δp after complete submersion of outlet 24 of tailpipe 22 is also a suitable feature to distinguish between filter regeneration and travel through shallow water, since in the former case a decrease in pressure difference Δp is followed by a gradual, continuous increase of same once again, as illustrated in FIG. 2, while in the latter case a wave-like curve of pressure difference Δp is noted as the result of the exhaust gas exiting in the form of individual bubbles, as illustrated by D in FIG. 3.

The curves of pressure difference Δp illustrated in FIGS. 2 and 3 represent ideal curves, which in practice in particular may also have other shapes.

When the evaluation of the curve of pressure difference Δp in evaluation unit 48 indicates that outlet 24 of tailpipe 22 of exhaust system 16 is completely or partially immersed in water, evaluation unit 48 transmits via signal line 52 a blocking signal to automatic start-stop system 50, which prevents the diesel engine from being shut off by automatic start-stop system 50, when automatic start-stop system 50 is switched on. This ensures that exhaust gas is discharged during travel through shallow or deeper water, so that damage to components of the exhaust gas aftertreatment system due to penetrating water may be reliably prevented.

When pressure difference Δp detected by differential pressure sensor 34 once again sharply increases when tailpipe 22 emerges from the water, evaluation unit 48 transmits an enabling signal to automatic start-stop system 50, which is reset to its original operating state before the receipt of the blocking signal.

What is claimed is:

1. A method for operating a motor vehicle having an internal combustion engine, the method comprising:
    evaluating, by an engine control unit, a pressure difference to detect a blockage of a tailpipe of an exhaust tract of the internal combustion engine during operation of the motor vehicle, wherein the blockage occurs by immersion or submersion in water, sludge, or similar liquid media, and
    wherein the internal combustion engine is prevented from shutting off when the immersion or submersion of the tailpipe in the water, sludge, or similar liquid media is detected.

2. The method of claim 1, wherein the pressure difference between exhaust gas pressures upstream from and downstream from a particle filter in the exhaust tract of the internal combustion engine is evaluated to detect the immersion or submersion of the tailpipe.

3. The method of claim 1, wherein the pressure difference is detected with the aid of a differential pressure sensor.

4. The method of claim 1, wherein a time-dependent change in the pressure difference is evaluated to detect the immersion or submersion of the tailpipe.

5. The method of claim 1, wherein the detected pressure difference is compared to at least one stored pressure difference.

6. A method for operating a motor vehicle having an internal combustion engine, the method comprising:
    evaluating, by an engine control unit, a pressure difference to detect a blockage of a tailpipe of an exhaust tract of the internal combustion engine during operation of the motor vehicle, wherein the blockage occurs by immersion or submersion in water, sludge, or similar liquid media, and
    wherein the shut-off internal combustion engine is started when the immersion or submersion of the tailpipe in water is detected.

7. The method of claim 6, wherein the rotational speed of the internal combustion engine is increased after starting.

8. The method of claim 6, wherein the point in time of the start of at least one of an injection and an ignition angle of the internal combustion engine is adjusted after starting.

9. A motor vehicle, comprising:
    an internal combustion engine;
    a differential pressure sensor or two pressure sensors for detecting a pressure difference;
    an evaluation unit for evaluating the pressure difference detected by the differential pressure sensor; and
    a controlling arrangement to control an automatic start-stop system or an ignition system of the motor vehicle as a function of the result of the evaluation,
    wherein the evaluation unit transmits a blocking signal to the automatic start-stop system or to the ignition system when the detected pressure difference which is evaluated by the evaluation unit indicates a blockage of a tailpipe of the exhaust tract, wherein the blockage occurs by immersion or submersion in water, sludge, or similar liquid media, and wherein the blocking signal prevents the internal combustion engine from shutting off during operation of same.

\* \* \* \* \*

UNITED STATES PATENT AND TRADEMARK OFFICE
CERTIFICATE OF CORRECTION

PATENT NO.        : 8,688,360 B2  
APPLICATION NO.   : 13/057520  
DATED             : April 1, 2014  
INVENTOR(S)       : Norden et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 424 days.

Signed and Sealed this

Twenty-ninth Day of September, 2015

Michelle K. Lee  
*Director of the United States Patent and Trademark Office*